A. G. SNYDER.
COMPUTING MECHANISM.
APPLICATION FILED JUNE 3, 1910.

1,132,804.

Patented Mar. 23, 1915.
4 SHEETS—SHEET 3.

WITNESSES:

INVENTOR
Augustus G. Snyder
BY
Attorneys

A. G. SNYDER.
COMPUTING MECHANISM.
APPLICATION FILED JUNE 3, 1910.

1,132,804.

Patented Mar. 23, 1915.
4 SHEETS—SHEET 4.

WITNESSES:

INVENTOR
Augustus G. Snyder
BY
Calvert Calvert
Attorneys

UNITED STATES PATENT OFFICE.

AUGUSTUS G. SNYDER, OF UTICA, NEW YORK, ASSIGNOR, BY MESNE ASSIGNMENTS, TO GEORGE H. SPITZLI, OF UTICA, NEW YORK.

COMPUTING MECHANISM.

1,132,804.  Specification of Letters Patent.  Patented Mar. 23, 1915.

Application filed June 3, 1910. Serial No. 564,875.

*To all whom it may concern:*

Be it known that I, AUGUSTUS G. SNYDER, a citizen of the United States, residing at Utica, in the county of Oneida and State of New York, have invented or discovered certain new and useful Improvements in Computing Mechanisms, of which the following is a specification, reference being had therein to the accompanying drawings.

This invention relates to computing and registering machines and is herein shown and described as embodied in a machine of the general type of that disclosed in my application for Letters Patent filed May 28, 1910, Serial No. 564,300, although, as will hereinafter appear to those skilled in the art, the utility of many features thereof is not by any means limited to machines of this type.

One object of the invention is to provide a computing attachment for typewriting machines which will be universally applicable to all machines without reference to size, dimensions, or features of construction.

A further object of the invention is to provide an improved form of controlling mechanism corresponding in general function to the escapement mechanism described and shown in my application aforesaid.

These and other objects of the invention, together with means whereby the same may be carried into effect, will best be understood from the following description of one form or embodiment thereof illustrated in the accompanying drawings. It is to be understood, however, that the construction described and shown has been chosen for illustrative purposes merely, and that the invention may be embodied in many other forms without departing from the spirit and scope thereof.

In said drawings.

The computing mechanism herein shown is preferably constructed as an attachment for typewriting machines, and, as above noted, it is one of the objects of the invention to provide mechanism which will be readily applicable to mechanism of this character, but it will be obvious to those skilled in the art that, with slight modification of the construction about to be described, this computing mechanism might be embodied in a machine independent of the typewriting mechanism, and such is considered to be within the scope of the invention.

20 denotes a typewriter frame having a carriage 21, movable longitudinally thereof and fed in any usual or well known manner, and 22 one of the key levers for operating the type-writing mechanism. In order to avoid confusion the remaining features of the typewriter construction are omitted.

Figures 1, 2:
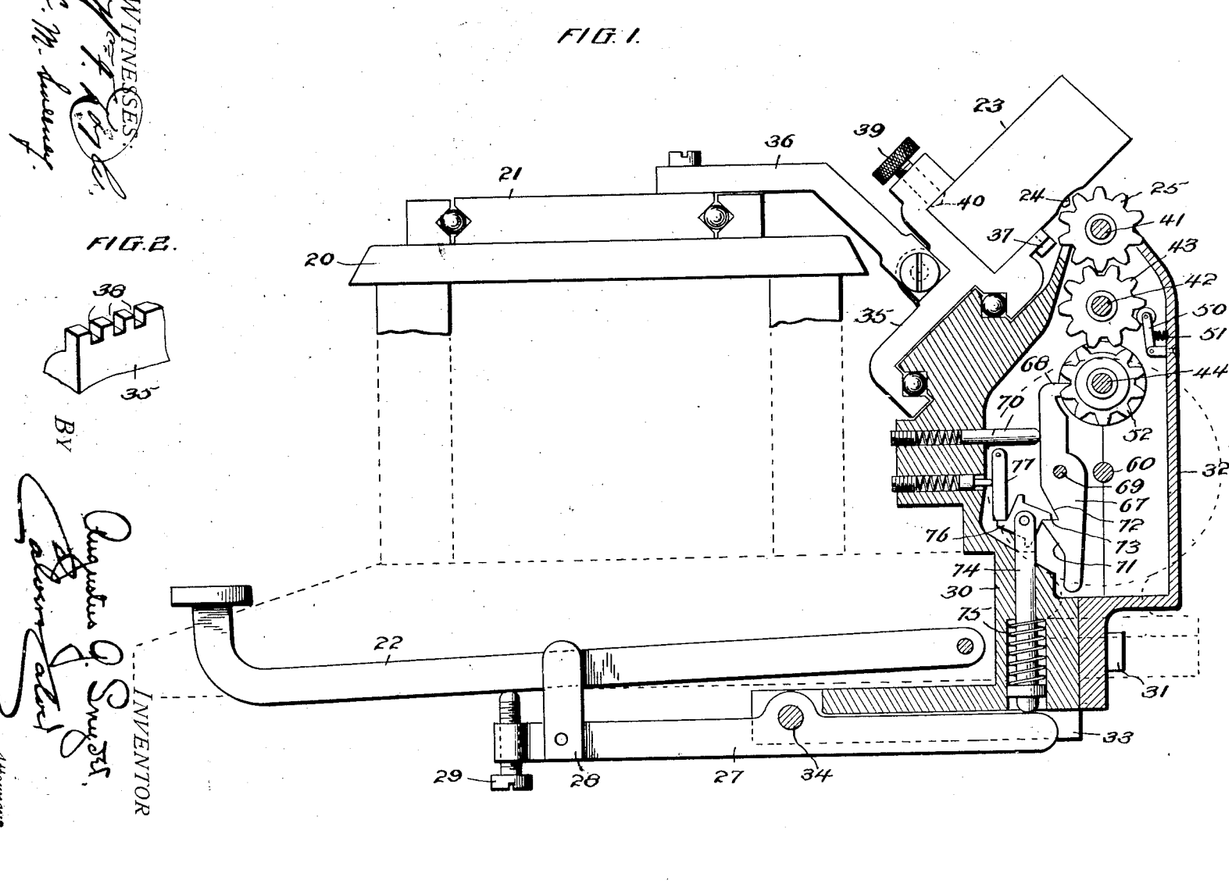
Figure 1 is a side elevation, partly in section, of a portion of a typewriter having my invention applied thereto.
Fig. 2 is a detail perspective view of a portion of the totalizer carriage.

The general organization of the computing machine herein shown, as to the relationship of the various coöperating parts, is substantially similar, except as hereinafter pointed out, to that shown and described in my prior application above specified, to which reference may be had for a more complete exposition of the construction and operation of parts not fully shown and described herein. As in said prior application the totalizing mechanism includes one or more totalizers 23 movable with the typewriter carriage 21 in the feed of the latter, and having a series of gears 24 brought, during said feed, successively into engagement with a master gear 25 which is actuated or rotated, through suitable connecting mechanism, by means of a motor or actuator 26 (Fig. 3), the times and amounts of said rotation being governed by suitable mechanism controlled by arms 27 (Fig. 1)

preferably detachably and adjustably connected with the numeral key levers of the typewriter by stirrups 28 and adjusting screws 29.

As herein shown the computer frame 30, which is attached to the typewriter frame 20 by any suitable means such as bolts 31, is formed as a casing having a rear cover plate 32 inclosing the operating mechanism, and provided with grooves 33 for the reception of the arms 27 which are pivoted to said frame at 34. In accordance with the present invention, the totalizer 23 is preferably carried by a separate totalizer carriage 35 mounted on the computer frame 30 for movement thereon parallel to the movement of the typewriter carriage 21 and connected therewith by suitable means such as the arm 36. As shown the totalizer is secured to the carriage 35 by means of a hooked lug 37 (see Fig. 1) carried by the totalizer casing and engaging in one of a series of notches 38 (see Fig. 2) formed in said carriage, and a set screw 39 entering a recess 40 in said totalizer casing. By the use of the separate totalizer carriage the mechanism is rendered readily applicable to any typewriting machine without reference to the height of the typewriter frame or the form or location of the typewriter carriage, variations in these parts being easily provided for merely by varying the size or form of the arm 36.

Figure 3:
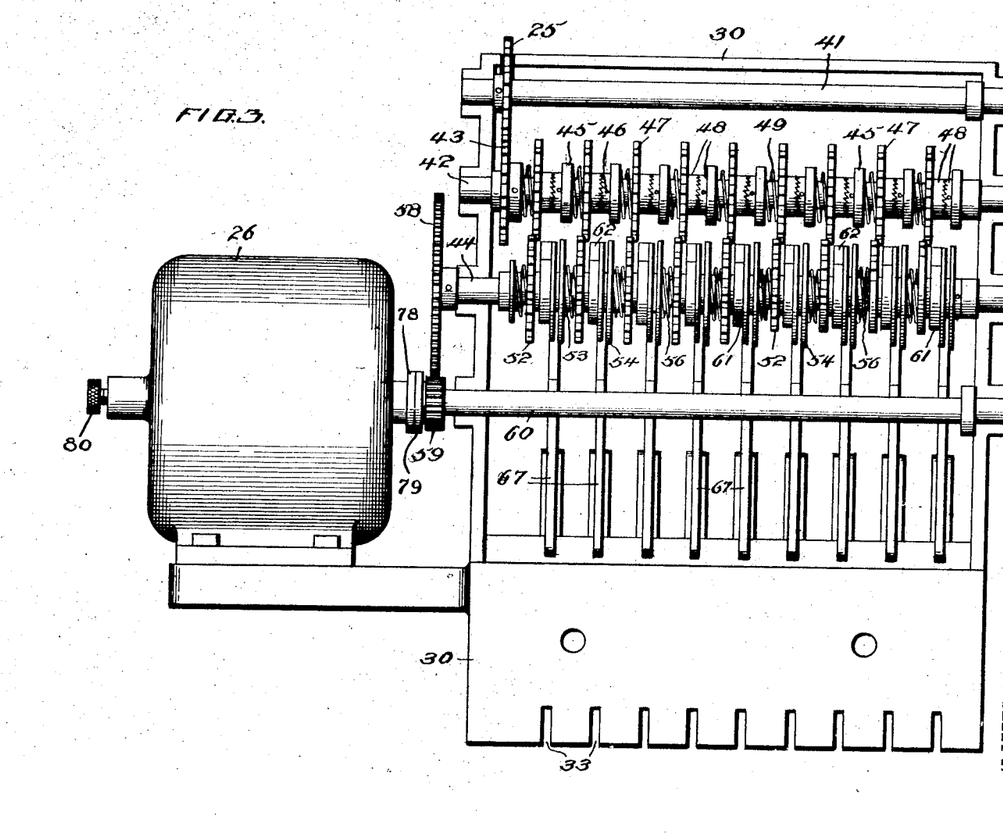
Fig. 3 is a rear elevation of the computer mechanism, the totalizer carriage, rear cover plate, and operating arms being removed.
Figure 7:
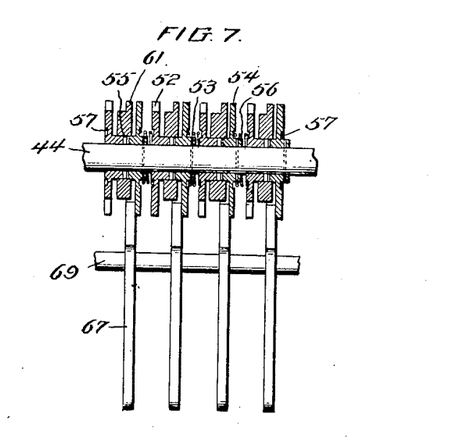
Fig. 7 is a sectional view thereof.
Figure 13:
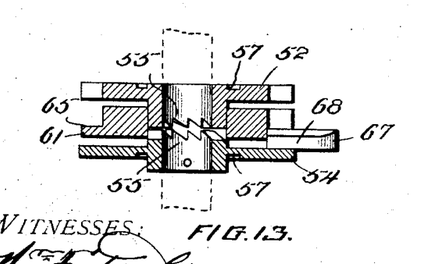
Figs. 13 and 14 are sectional views showing one of the groups of parts associated with the actuating shaft in two different positions.

The preferred construction of the various parts of the mechanism for operating the totalizing mechanism will now be described in detail and the operation thereof will thereafter be fully described. The master gear 25 is mounted on a shaft 41 journaled in the computer frame, and is driven by a countershaft 42, preferably by means of a gear 43 mounted on said countershaft and meshing directly with said master gear, said countershaft 42 forming an operative connection between said master gear and a second countershaft 44 constituting the actuating shaft of the machine. The shafts 42 and 44 are preferably arranged parallel to one another and are provided with connecting mechanism, controlled by means hereinafter described, whereby the shaft 42 is caused to make a certain predetermined fraction of a rotation at each complete rotation of the actuating shaft. The shaft 42 is provided with a series of collars 45 secured to said shaft for rotation therewith by pins 46, and with a series of gears 47 loosely mounted thereon. The adjacent collars and gears are provided with coöperating ratchet clutch faces 48, whereby the shaft 42 may be rotated in one direction independently by each of said gears 47. For holding the clutch faces of each pair normally in engagement there are provided springs 49 interposed between adjacent gears and collars and preferably received in recesses formed in the faces of these members. For normally holding the gears 47 against rotation each of said gears is preferably provided with a yielding detent 50 pivoted to the cover plate 32 and held in position by a spring 51. Loosely mounted on the actuating shaft 44 are a series of rotatable actuator members or gears 52, two of which are shown in detail in Figs. 9 and 10, said gears having a progressively varying number of teeth, herein shown as from one to nine. The gears 52 are adapted to mesh respectively with the gears 47 in pairs as shown, and although said gears 52 are preferably movable longitudinally of the shaft 44, this movement is preferably insufficient in amount to move said gears 52 out of engagement or operative relationship with the gears 47, whereby the relative angular positions of these gears will remain undisturbed. This is illustrated in Fig. 3 in which the gears 52 are shown as at the limits of their movements toward the left but still in position to engage or be engaged by the gears 47. Intermediate the gears 52 there are fixed to the shaft 44, as by pins 53, a series of collars 54, said gears and collars having coöperating clutch faces 55 (see Figs. 7, 13, and 14) normally held in engagement by springs 56 received in recesses 57 in a manner similar to the springs 49.

Figure 4:
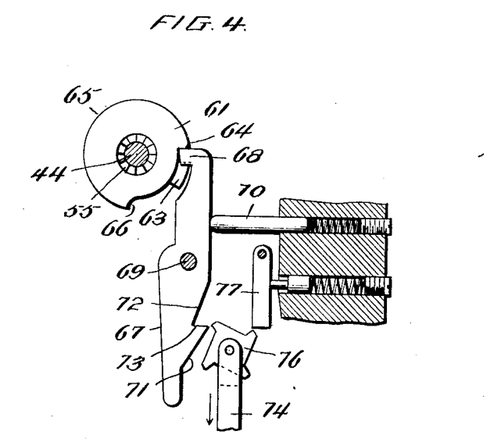
Figs. 4 and 5 are detail views showing one of the stop hubs, stop arms, and operating rods from opposite sides and in two different positions.
Figure 11:
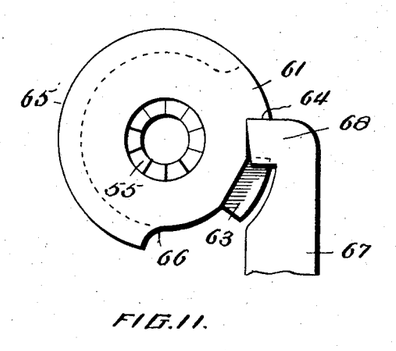
Figs. 11 and 12 are detail views showing a stop hub and its coöperating stop arm in two different relative positions.

In the operation of the machine the actuating shaft 44 preferably rotates continuously, being preferably geared to a continuously running motor 26 supported by the computer frame by a gear 58 secured to said shaft 44 and a gear 59 secured to the motor shaft 60. From the foregoing it will be seen that when the clutch face 55 of any of the gears 52 is in engagement with the coöperating clutch face of the adjacent collar 54, the shaft 42, and consequently the master gear 25, will, at each rotation of the shaft 44, be turned through a fraction of a rotation depending in amount upon the number of teeth upon the gear 52 in question. For controlling the connection of the respective gears 52 with the shaft 44 the following stop mechanism is provided. Each of the gears 52 is provided with a stop hub 61 fast thereto, said stop hub having on its periphery a projection 62 providing a lateral cam face 63 (see Fig. 8) and beyond said projection a stop shoulder 64. A portion 65 beyond said stop shoulder is preferably formed on a radius substantially equal to that of the outer end of said stop shoulder and is cut away at 66 immediately in front of the projection 62. Coöperating with each of the stop hubs 61 is a stop arm 67, said arms having inturned ends 68 lying adjacent the collars 54 and in a position to coöperate with the stop shoulders 64, said ends being preferably beveled to coöperate with the cam faces 63, thereby tending to move the hubs 61 and gears 52 to release the clutch members 55. The stop arms 67 are pivoted at 69 in the computer frame, and are normally held with their ends 68 in engagement with the stop hubs 61 and against the stop shoulders 64, as shown in Figs. 4 and 11, by spring pressed plungers 70, thereby normally holding the gears 52 unclutched from the shaft 44 and against rotation therewith. Said stop arms are also formed with cam surfaces 71 terminating in recesses 72 providing shoulders 73. Mounted for longitudinal movement in the computer frame is a series of operating rods 74 (see Figs. 1, 4 and 5) each held by a spring 75 with one of its ends in engagement with one of the operating arms 27. To the opposite end of each of the rods 74 is pivoted a toothed wheel or ratchet 76, the teeth of said ratchets being constructed and arranged to engage the cam surfaces 71 and enter the recesses 72 of the respective stop arms 67. Coöperating with the ratchets 76 is a series of spring pressed pawls 77.

Figure 5:
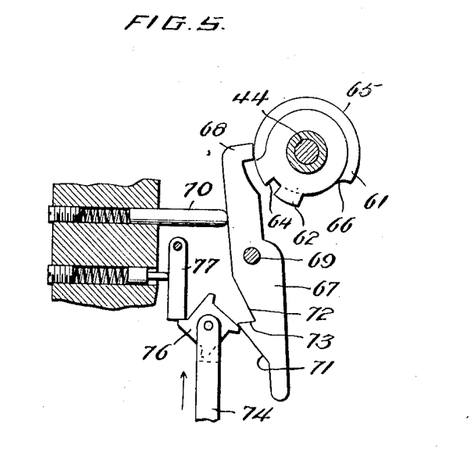
Figure 6:
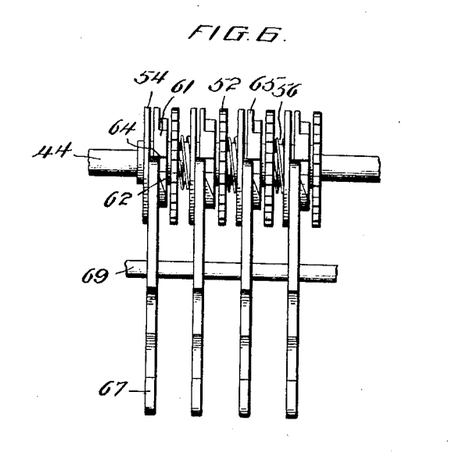
Fig. 6 is a detail elevation of the actuating shaft and parts associated therewith.
Figure 12:
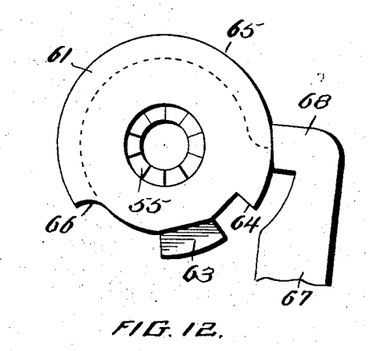
Figure 14:
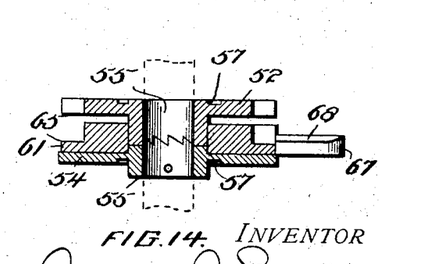

The operation of the mechanism above described is as follows. Assuming, for convenience, that the key lever 22 corresponding to the numeral "6" is depressed, such depression will cause the corresponding arm 27 to be operated and the rod 74 in engagement therewith to be moved longitudinally in the direction indicated by the arrow on Fig. 5 in opposition to the spring 75. One of the teeth of the ratchet 76 being at this time held by the pawl 77 against movement with the rod 74, said ratchet will be partly rotated, causing an opposite tooth to engage the cam surface 71 of the corresponding stop arm 67 (as shown in Fig. 5) and thereafter to enter the recess 72 of said arm, the parts then being in the position shown in Fig. 1. During this operation the stop arm will be rocked in opposition to the spring pressed plunger 70 and immediately released and again placed under the influence of said plunger. This rocking of the stop arm causes the end 68 thereof to be momentarily removed from engagement with the stop shoulder 64 and cam face 63 of the corresponding stop hub 61, thereby permitting the corresponding spring 56 to move the gear 52 to which said stop hub is attached longitudinally of the shaft 44, bringing the clutch faces 55 into engagement as shown in Fig. 14, and causing said gear to be rotated by said shaft. The immediate release of the stop arm 67 by the ratchet 76 causes the plunger 70 to press the end 68 of said arm into engagement with the peripheral portion 65 of the stop hub 61, as shown in Fig. 12, so that when the cut away portion 66 is reached said end will be brought to a position to engage the cam surface 63. Such engagement will cause the gear 52 to be moved longitudinally of the shaft 44 to release the clutch members 55, the stop shoulder 64 being thereafter brought into engagement with said end 68, thereby stopping the gear 52 after one complete rotation thereof (see Figs. 11 and 13).

Figure 8:
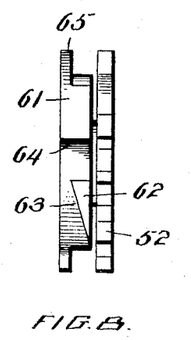
Fig. 8 is an edge view of one of the actuator gears with its attached stop hub.
Figure 9:
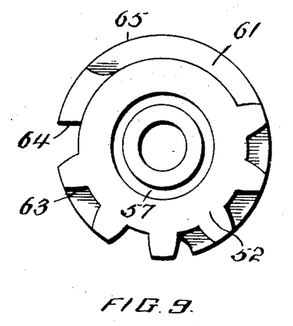
Figs. 9 and 10 are face views of two of the actuator gears.
Figure 10:
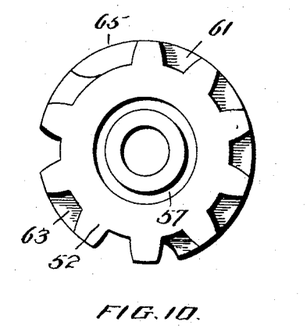

As above noted the gears 52 are formed with a progressively varying number of teeth, the number of teeth on any particular gear being chosen in accordance with the numeral key lever with which it is connected by the train of mechanism above described. In the present embodiment of the invention the gear 52 connected with the "6" key is provided with six teeth as shown in Fig. 9, that connected with the "9" key is provided with nine teeth, as shown in Figs. 8 and 10, and the others in accordance with this ratio. The depression of the "6" key, and the consequent operation of the mechanism controlled thereby as above described, will therefore cause the corresponding gear 52, during its single complete rotation, to rotate the gear 47 on the shaft 42 with which it is in mesh through an arc corresponding to six teeth. Each of the gears 47 are preferably provided with ten teeth, so that the gear 47 in question will be moved through six tenths of a rotation. The actuation of this gear will cause a corresponding actuation of the shaft 42 through six tenths of a rotation, the remaining gears 47 being at this time held against rotation by the yielding detents 50, while the springs 49 corresponding to these remaining gears yield to permit the ratchet clutch members 48 to move over one another idly. By these means the master gear 25 is turned through a fractional rotation and the totalizer 23 actuated (as more fully described in my application aforesaid) an amount determined by the key lever which has been depressed. Upon the release of the key lever the spring 75 will cause a movement of the rod 74 from the position shown in Fig. 1 in the direction indicated by the arrow on Fig. 4. The tooth of the ratchet 76 which has entered the recess 72 in the stop arm 67 will be held by the shoulder 73 against this movement, so that said ratchet will be rotated, causing an opposite tooth to press back the pawl 77, and the rod 74 returned to normal position without affecting the stop arm 67.

It will be seen that the clutch members 55, and associated devices, provide means for positively connecting the actuator 26 and totalizer 23 in a manner and at a time determined by the operator. In order to provide against damage to the parts in case of improper operation there is preferably interposed between the motor 26 and the actuating shaft 44 a frictional or slip connection which is normally permanent but which is adapted to yield if necessary. Such a connection is provided in the construction shown by a friction clutch comprising a friction flange 78 carried by the rotating part of the motor 26 and a coöperating friction flange 79 on the motor shaft 60, the normal pressure of said flanges being adjustable by means of a screw 80.

It will be noted that the construction and arrangement of the rods 74, stop arms 67, and associated parts are such that the stop mechanism is released to start the operation of the computing mechanism during the first portion of the movement of a key 22 and arm 27, or before said key is fully depressed. The remaining portion of the downward movement of the key, so far as the computing mechanism is concerned, is an idle one, the ratchet 76 having released the arm 67. The operation of the computing mechanism therefore continues during the latter portion of the movement of the key, so that by the time the printing mechanism of the typewriter has completed its operation the computing operation is also completed. This feature is of importance in a computing attachment for typewriters inasmuch as it is desirable that the speed at which the typewriting mechanism may be operated be not in any way limited by the speed of operation of the computing mechanism.

Having thus described my invention I claim and desire to secure by Letters Patent:

1. In a computing machine, the combination with totalizing mechanism and a master gear for actuating the same, of operating mechanism for said master gear including an actuator, and means for operatively connecting said actuator and totalizing mechanism comprising a series of gears and means for independently connecting said gears with said actuator.

2. In a computing machine, the combination with totalizing mechanism and a master gear for actuating the same, of operating mechanism for said master gear including a series of gears, connections whereby each of said gears is adapted independently to operate said master gear, an actuator, and means for independently connecting said gears with said actuator.

3. In a computing machine, the combination with totalizing mechanism and a master gear for actuating the same, of operating mechanism for said master gear including an actuator, a series of gears, connections whereby each of said gears is adapted independently to operate said master gear, and a second series of gears for independently connecting each of said first named gears with said actuator.

4. In a computing machine, operating mechanism including, in combination, a shaft, a series of collars on said shaft, a series of gears on said shaft intermediate said collars, said collars and gears being provided with coöperating clutch faces, and a spring interposed between each of said gears and the next adjacent collar.

5. In a computing machine, the combination with totalizing mechanism, of operating mechanism therefor including a shaft, a series of gears on said shaft, devices for normally holding each of said gears against rotation, and devices whereby said shaft may be rotated by each of said gears.

6. In a computing machine, the combination with totalizing mechanism, of operating mechanism therefor including a shaft, a series of gears on said shaft, a series of yielding detents for normally holding each of said gears against rotation, and a ratchet connection between each of said gears and said shaft.

7. In a computing machine, the combination with totalizing mechanism, of operating mechanism therefor including a motor, a countershaft operatively connected with said totalizing mechanism, a second countershaft operatively connected with said motor, and means operatively connecting said countershafts for producing differential operations of said first named countershaft.

8. In a computing machine, the combination with totalizing mechanism, of operating mechanism therefor including a motor, a countershaft operatively connected with said totalizing mechanism, a second countershaft operatively connected with said motor, and a series of gear connections between said countershafts.

9. In a computing machine, in combination, a totalizer, a master gear for operating said totalizer, a countershaft for operating said master gear, a motor, a second counter-shaft operatively connected with said motor, and means operatively connecting said countershafts for controlling the operation of said master gear by said motor.

10. In a computing machine, the combination with totalizing mechanism, of operating mechanism therefor including a shaft, a series of gears adapted independently to rotate said shaft, a motor, a countershaft operatively connected with said motor, and a second series of gears on said countershaft coöperating with the gears of said first-named series.

11. In a computing machine, in combination, a totalizer, a master gear for operating said totalizer, a countershaft for operating said master gear, a series of gears on said countershaft, devices for normally holding each of said gears against rotation, and devices whereby said shaft may be rotated by each of said gears.

12. In a computing machine, in combination, a totalizer, a master gear for operating said totalizer, a countershaft for operating said master gear, a series of gears on said countershaft, an actuator, and means for independently connecting said gears with said actuator.

13. In a computing machine, the combination with totalizing mechanism, of operating mechanism therefor including an actuator, a shaft, a series of gears on said shaft, means for independently connecting said gears with said actuator, devices for normally holding each of said gears against rotation, and devices whereby said shaft may be rotated by each of said gears.

14. In a computing machine, the combination with totalizing mechanism, of operating mechanism therefor including a motor, a countershaft operatively connected with said totalizing mechanism, a series of gears on said countershaft, a second countershaft operatively connected with said motor, and means for independently connecting said gears with said last-named countershaft.

15. In a computing machine, the combination with totalizing mechanism, of operating mechanism therefor including a motor, a countershaft operatively connected with said totalizing mechanism, a series of gears on said countershaft, devices for normally holding each of said gears against rotation, devices whereby said countershaft may be rotated by each of said gears, a second countershaft operatively connected with said motor, and means for operatively connecting said gears with said last-named countershaft.

16. In a computing machine, operating mechanism including, in combination, two parallel shafts, a series of gears for each of said shafts, and devices for operatively connecting the several gears of each series with their respective shafts.

17. In a computing machine, operating mechanism including, in combination, two parallel shafts, a series of gears loosely mounted on each of said shafts, and a plurality of ratchet clutches for operatively connecting the several gears of each series with their respective shafts.

18. In a computing machine, in combination, a totalizer, a master gear for operating said totalizer, a countershaft for operating said master gear, a second countershaft, a series of gears for each of said countershafts, and devices for operatively connecting the several gears of each series with their respective countershafts.

19. In a computing machine, the combination with totalizing mechanism, of operating mechanism therefor including a shaft, a series of gears adapted independently to rotate said shaft, a countershaft, a series of gears on said countershaft, and devices for operatively connecting the several gears of said last-named series with said countershaft.

20. In a computing machine, operating mechanism including, in combination, two parallel shafts, a series of gears for each of said shafts, the opposite gears of the respective series being in continuous engagement, and devices for operatively connecting the several gears of each series with their respective shafts.

21. In a computing machine, the combination with totalizing mechanism, of operating mechanism therefor including a shaft, a series of gears on said shaft, devices for normally holding each of said gears against rotation, devices whereby said shaft may be rotated by each of said gears, a countershaft, a series of gears on said countershaft, the opposite gears of the respective series being in continuous engagement, and devices for operatively connecting the several gears of said last-named series with said countershaft.

22. In a computing machine, operating mechanism including, in combination, an actuating shaft, a countershaft, a series of devices connecting said shafts each adapted to cause said countershaft to make a predetermined fraction of a rotation at each complete rotation of said actuating shaft, and mechanism for selectively controlling said connecting devices.

23. In a computing machine, in combination, a totalizer, means for operating said totalizer, an actuating shaft, a single countershaft operatively connected with said totalizer operating means, mechanism connecting said shafts for causing said countershaft to make a predetermined fraction of a rotation at each complete rotation of said actuating shaft, and mechanism for controlling the amount of said fraction.

24. In a computing machine, in combination, a totalizer, a master gear for operating said totalizer, said totalizer and master gear being relatively movable to cause said master gear successively to engage different portions of said totalizer, a countershaft for operating said master gear, an actuating shaft, mechanism connecting said shafts for causing said countershaft to make a predetermined fraction of a rotation at each complete rotation of said actuating shaft, and mechanism for controlling the amount of said fraction.

25. In a computing machine, operating mechanism including, in combination, an actuating shaft, a countershaft, a series of gears for each of said shafts, the gears of the respective series being arranged in pairs and the gears of each pair being constructed to cause said countershaft to make a predetermined fraction of a rotation at each complete rotation of said actuating shaft, and devices for operatively connecting the several gears of each series with their respective shafts.

26. In a computing machine, the combination with totalizing mechanism, of operating mechanism therefor comprising a continuously rotating shaft, connecting mechanism intermediate said shaft and said totalizing mechanism, and normally disconnected from said shaft, and controlling mechanism including means connecting said first named connecting mechanism to said shaft for causing said totalizing mechanism to be actuated a predetermined amount thereby.

27. In a computing mechanism, the combination with totalizing mechanism, of operating mechanism therefor comprising a continuously rotating shaft, and controlling mechanism comprising a series of gears on said shaft each adapted to operate said totalizing mechanism a predetermined amount, and clutches for independently connecting each of said gears to said shaft.

28. In a computing machine, in combination, a totalizer, a master gear for operating said totalizer, a countershaft for operating said master gear, a continuously rotating shaft, and controlling mechanism including means for operatively connecting said countershaft with said continuously rotating shaft for causing said totalizer to be actuated a predetermined amount.

29. In a computing machine, the combination with totalizing mechanism, of operating mechanism therefor including a countershaft, a series of gears adapted independently to rotate said countershaft, a continuously rotating shaft, and controlling mechanism including means for operatively connecting the several gears of said series with said continuously rotating shaft for causing said totalizing mechanism to be actuated a predetermined amount thereby.

30. In a computing machine, the combination with totalizing mechanism, of operating mechanism therefor including a countershaft, a series of gears on said countershaft, devices for normally holding each of said gears against rotation, devices whereby said countershaft may be rotated by each of said gears, a continuously rotating shaft, and means for operatively connecting the several gears of said series with said continuously rotating shaft for causing said totalizing mechanism to be actuated a predetermined amount thereby.

31. In a computing machine, in combination, a totalizer, a master gear for operating said totalizer, a countershaft for operating said master gear, a motor, a second countershaft geared to said motor, and operative connections between said countershafts for producing differential operations of said first named countershaft.

32. In a computing machine, the combination with totalizing mechanism, of operating mechanism therefor including a shaft, a series of gears adapted independently to rotate said shaft, a motor, a countershaft geared to said motor, and gears carried by said countershaft and coöperating with said first named gears.

33. In a computing machine, the combination with totalizing mechanism, of operating mechanism therefor including a shaft, a series of gears on said shaft, devices for normally holding each of said gears against rotation, devices whereby said shaft may be rotated by each of said gears, a motor, a countershaft geared to said motor, and gears carried by said countershaft and coöperating with said first-named gears.

34. In a computing machine, the combination with totalizing mechanism, of operating mechanism therefor including a motor, a countershaft operatively connected with said totalizing mechanism, a second countershaft geared to said motor, and means for operatively connecting said countershafts.

35. In a computing machine, operating mechanism including, in combination, a motor, two parallel shafts one of said shafts being geared to said motor, a series of gears for each of said shafts, and devices for operatively connecting the several gears of each series with their respective shafts.

36. In a computing machine, operating mechanism including, in combination, a motor, two parallel shafts one of said shafts being geared to said motor, a series of gears for each of said shafts, the opposite gears of the respective series being in continuous engagement, and devices for operatively connecting the several gears of each series with their respective shafts.

37. In a computing machine, the combination with totalizing mechanism, of operating mechanism therefor comprising a continuously running motor, a countershaft geared thereto, and controlling mechanism including means for operatively connecting said totalizing mechanism with said countershaft for causing said totalizing mechanism to be actuated a predetermined amount thereby.

38. In a computing machine, the combination with totalizing mechanism, of operating mechanism therefor comprising a series of gears, said gears having a progressively varying number of teeth, and a second series of gears coöperating with said first-named gears respectively.

39. In a computing machine, in combination, a totalizer, a master gear for operating said totalizer, a countershaft for operating said master gear and having a series of gears, and a second series of gears coöperating with the gears of said first named series, the gears of one of said series having a progressively varying number of teeth.

40. In a computing machine, the combination with totalizing mechanism, of operating mechanism therefor including a shaft, a series of gears adapted independently to rotate said shaft, and a second series of gears coöperating with the gears of said first named series, the gears of one of said series having a progressively varying number of teeth.

41. In a computing machine, the combination with totalizing mechanism, of operating mechanism therefor including a motor, a countershaft operatively connected with said totalizing mechanism, a second countershaft operatively connected with said motor, and a series of gears carried by each of said countershafts, the gears of one of said series having a progressively varying number of teeth.

42. In a computing machine, the combination with totalizing mechanism, of operating mechanism therefor comprising a continuously rotating shaft, a series of gears on said shaft, and a second series of coöperating gears operatively connected with said totalizing mechanism, the gears of one of said series having a progressively varying number of teeth.

43. In a computing machine, the combination with totalizing mechanism, of operating mechanism therefor comprising a motor, a countershaft geared to said motor, a series of gears on said countershaft, and a second series of coöperating gears operatively connected with said totalizing mechanism, the gears of one of said series having a progressively varying number of teeth.

44. In a computing machine, operating mechanism including, in combination, a shaft, a series of gears on said shaft, said gears having a progressively varying number of teeth, and devices for independently connecting each of said gears to said shaft.

45. In a computing attachment for typewriters, operating mechanism including, in combination, a shaft, a series of gears on said shaft, said gears having a progressively varying number of teeth, devices for independently connecting each of said gears to said shaft, and means for connecting each of said devices with a key lever of a typewriter.

46. In a computing machine, operating mechanism including, in combination, a shaft, a series of gears loose on said shaft, said gears having a progressively varying number of teeth, and a series of collars fast on said shaft intermediate said gears, the adjacent collars and gears of said series being provided with coöperating clutch faces.

47. In a computing machine, the combination with totalizing mechanism, of operating mechanism therefor including a series of rotatable members, an actuator for said members, connecting mechanism for causing said totalizing mechanism to be actuated a predetermined amount at each rotation of each of said rotatable members, and mechanism for connecting each of said rotatable members with said actuator and for automatically disconnecting the same therefrom when said member has been rotated a fixed amount by said actuator.

48. In a computing machine, in combination, a totalizer, a master gear for operating said totalizer, a countershaft for operating said master gear, a series of rotatable members and connections for causing said countershaft to be rotated a predetermined amount at each rotation of each of said rotatable members, an actuator for said members, and mechanism for connecting each of said rotatable members with said actuator and for automatically disconnecting the same therefrom when said member has been rotated a fixed amount by said actuator.

49. In a computing machine, the combination with totalizing mechanism, of operating mechanism therefor including a shaft, a series of gears adapted independently to rotate said shaft, a second shaft, a second series of gears on said last-named shaft and coöperating respectively with the gears of said first-named series, and mechanism for connecting each of said last-named gears with said last-named shaft and for automatically disconnecting the same therefrom when said gear has been rotated a fixed amount by said shaft.

50. In a computing machine, the combination with totalizing mechanism, of operating mechanism therefor including a motor, a countershaft operatively connected with said totalizing mechanism, a second countershaft operatively connected with said motor, a series of gears carried by each of said shafts, and a stop mechanism for each of the gears of one of said series for causing said gear to be rotated a fixed amount at each operation of said stop mechanism.

51. In a computing machine, the combination with totalizing mechanism, of operating mechanism therefor including a continuously rotating shaft, a series of gears on said shaft, and a stop mechanism for each of said gears for causing said gear to be rotated a fixed amount by said shaft at each operation of said stop mechanism.

52. In a computing machine, the combination with totalizing mechanism, of operating mechanism therefor including two series of coöperating gears, the gears of one of said series having a progressively varying number of teeth, and a stop mechanism for each of the gears of one of said series for causing said gear to be rotated a fixed amount at each operation of said stop mechanism.

53. In a computing machine, the combination with totalizing mechanism, of operating mechanism therefor including a rotatable member, means for rotating said member, means for operatively connecting said member with its rotating means, means for operatively connecting said member with said totalizing mechanism, and means for disengaging said connecting means and stopping said member at the completion of each rotation thereof.

54. In a computing machine, operating mechanism including, in combination, a shaft, a collar mounted on said shaft for rotation therewith, a gear loosely mounted on said shaft, said collar and gear having coöperating clutch members and being relatively movable longitudinally of said shaft to engage and release said clutch members, a spring for holding said clutch members in engagement, a hub carried by one of said relatively movable parts and having a lateral cam face and a stop shoulder, and an arm adapted to engage said cam face to release said clutch members and to engage said stop shoulder to stop the rotation of said hub.

55. In a computing machine, the combination with totalizing mechanism, of actuating mechanism therefor, and mechanism for controlling said actuating mechanism comprising stop mechanism including a stop arm, means for normally holding said stop arm in operative position, and means for withdrawing said stop arm and thereafter releasing the same.

56. In a computing machine, the combination with totalizing mechanism, of actuating mechanism therefor, and mechanism for controlling said actuating mchanism comprising a stop mechanism including a stop arm, means for normally holding said stop arm in operative position, said stop arm having a cam face terminating in a recess, and means for engaging said cam face to withdraw said stop arm, said means being adapted thereafter to enter said recess to release said stop arm.

57. In a computing machine, in combination, a totalizer, an actuator, mechanism for operatively connecting said totalizer and actuator, and means movable to engage a part of said last-named mechanism and thereafter release the same for causing an operation of said totalizer by said actuator.

58. In a computing machine, in combination, a totalizer, an actuator, mechanism for operatively connecting said totalizer and actuator, means movable to engage a part of said last named mechanism and thereafter release the same for causing an operation of said totalizer by said actuator, and means for connecting said last-named means with the key levers of a typewriter.

59. In a computing machine, in combination, a totalizer, an actuator, mechanism for operatively connecting said totalizer and actuator, and means movable in one direction to engage and move a part of said last-named mechanism, said means being movable in the opposite direction without affecting said part.

60. In a computing machine, the combination with totalizing mechanism, of operating mechanism therefor including a rotatable member, means for rotating said member, means for operatively connecting said member with its rotating means, means for operatively connecting said member with said totalizing mechanism, means for disengaging said connecting means and stopping said member at the completion of each rotation thereof, and means movable to engage said disengaging means and thereafter to release the same.

61. In a computing machine, controlling mechanism, including a stop arm having a cam face and a shouldered recess, a longitudinally movable operating rod, a ratchet carried by said rod having teeth adapted to engage said cam face and to abut against the shoulder of said recess, and a pawl engaging said ratchet.

62. In a computing machine, in combination, totalizing mechanism and operating mechanism therefor comprising a motor and means connecting said motor and totalizing mechanism, said means including an intermittent positive connection and a frictional connection.

63. In a computing machine, in combination, totalizing mechanism and operating mechanism therefor comprising a motor and means connecting said motor and totalizing mechanism, said means including an intermittent positive connection, means for controlling said positive connection, and a continuously operative frictional connection.

64. In a computing machine, in combination, totalizing mechanism and operating mechanism therefor comprising a motor and means connecting said motor and totalizing mechanism, said means including an intermittent positive connection, a frictional connection, and means for adjusting said frictional connection.

In testimony whereof I affix my signature, in presence of two witnesses.

AUGUSTUS G. SNYDER.

Witnesses:
CHAS. S. HYER,
ARTHUR W. CALVET.